United States Patent
Takahashi et al.

(10) Patent No.: US 6,506,469 B2
(45) Date of Patent: Jan. 14, 2003

(54) SURFACE-SIDE REPRODUCTION TYPE OPTICAL RECORDING MEDIUM

(75) Inventors: Koyata Takahashi, Kanagawa-ken (JP); Koji Katayama, Kanagawa-ken (JP); Keiichiro Nishizawa, Kanagawa-ken (JP)

(73) Assignee: Tosoh Corporation, Yamaguchi-ken (JP)

( * ) Notice: Subject to any disclaimer, the term of this patent is extended or adjusted under 35 U.S.C. 154(b) by 27 days.

(21) Appl. No.: 09/863,401

(22) Filed: May 24, 2001

(65) Prior Publication Data

US 2002/0054974 A1 May 9, 2002

(30) Foreign Application Priority Data

May 26, 2000 (JP) ........................................ 2000-161094

(51) Int. Cl.$^7$ ................................................. B32B 3/02
(52) U.S. Cl. ................. 428/64.1; 428/64.4; 430/270.11
(58) Field of Search .............................. 428/64.1, 64.4, 428/913; 430/270.11, 495.1, 945; 369/275.1

(56) References Cited

U.S. PATENT DOCUMENTS

| | | | |
|---|---|---|---|
| 5,004,307 A | 4/1991 | Kino et al. | 350/1.2 |
| 5,125,750 A | 6/1992 | Corle et al. | 359/819 |
| 5,883,872 A | 3/1999 | Kino | 369/112 |
| 2002/0044523 A1 * | 4/2002 | Oshima | 369/272 |
| 2002/0054983 A1 * | 5/2002 | Nishihara | 428/212 |
| 2002/0136146 A1 * | 9/2002 | Lee | 369/112.23 |
| 2002/0136148 A1 * | 9/2002 | Lee | 369/112.24 |

FOREIGN PATENT DOCUMENTS

JP    8-45109    2/1996    ............ G11B/7/24

OTHER PUBLICATIONS

Atsushi Fukumoto, et al., "Magneto–Optical Detection Using an Optical Phase Shifter in Higher Track Density Land/Groove Recording" *Jpn. J. Appl. Phys.*, vol. 37, (Apr., 1998) pp. 2144–2149, Part 1. No. 4B.

B.D. Terris, et al., "Near–field optical data storage" *Appl. Phys. Lett.*, 68, p. 141, Jan., 1996.

* cited by examiner

*Primary Examiner*—Elizabeth Mulvaney
(74) *Attorney, Agent, or Firm*—Sughrue Mion, PLLC (57) ABSTRACT

[Problem] A surface-side reproduction type optical recording medium exhibiting high reliability in continuous tests of recording and being suitable for near field recording capable of obtaining good recording/reproducing characteristics is presented.

[Means for solving the problem]

The surface-side reproduction type optical recording medium carries out recording or reproducing with laser beams from an optical head having a numerical aperture NA of more than 1 wherein the optical head is floated from the surface of the medium at a height of $\lambda/4$ or less where $\lambda$ is the wavelength of the laser beams, said optical recording medium comprising a substrate, and at least a recording layer and a transparent protective resin layer having a refractive index $n_p$ of more than the NA formed on the substrate wherein the diameter of the laser beams on the medium surface is from 1.5 $\mu$m to 30 $\mu$m.

28 Claims, 6 Drawing Sheets

36: $L_1 = 2d_2 \cdot \tan(\sin^{-1}(NA/n_2))$
37: $L_2 = L_1 + 2d_3 \cdot \tan(\sin^{-1}(NA/n_3))$

SURFACE-SIDE REPRODUCTION TYPE OPTICAL RECORDING MEDIUM

BACKGROUND OF THE INVENTION

1. Field of the Invention

The present invention relates to a recordable optical recording medium, in particular, a surface-side reproduction type optical recording medium wherein recording or reproducing is conducted by irradiating light from a front surface side of the optical recording medium.

2. Discussion of Background

An optical recording medium is a recording medium permitting large quantity and high density recording, for which there has been an increase of demand as a medium for a large volume file of computer or for recording dynamic images, in current fashion of multimedia.

The optical recording medium generally comprises a transparent circular disc-like substrate made of a plastic material or the like on which a multilayer including a recording layer is formed. Recording or erasing is carried out by irradiating laser light, and reproducing is carried out by reflection light of the laser light. The optical recording medium is classified into an erasable type capable of rewriting such as a magneto-optical recording medium or a phase-change recording medium and a write-once type capable of writing only once such as CD-R.

In the magneto-optical recording medium, a so-called light intensity modulation recording has mainly been used wherein information is erased by applying a fixed magnetic field, and then, recording is carried out by applying a fixed magnetic field in an opposite direction. However, in recent years, there has been noted a magnetic field modulation system wherein a magnetic field is modulated according to a recording pattern while laser light is irradiated because such system can record correctly information in one revolution (direct over-write) even at a high recording density.

The phase-change recording medium has recently been used widely because it is possible to conduct the direct over-writing by an optical modulation recording system and to conduct reproducing by the using the same optical system as for CD or DVD. Further, a write-once type CD-R is widely spread because it is completely compatible with CD.

As means for improving the recording density of the optical recording medium, a land/groove recording system, wherein recording is conducted to both a groove which has conventionally been used merely as a guide groove and a land as a recording area respectively, has been noted (Symposium of optical memories '94 Technical Digest p.41 (1994), Jpn, J. Appl. Phys. Vol. 37 p.2144 (1998)).

In such system, the reproduction of signals is obtainable with little crosstalk by using a technique that the width of a land is substantially equal to the width of a groove and the optical depth of the groove is about ⅙ of the laser wavelength, or a technique in combination of the optical depth being about ⅛ of the laser wavelength and independent phase adjustment on the land and the groove at the time of reproducing.

Conventionally, laser for recording or reproducing is irradiated to the recording layer through the substrate. As a technique of bringing an optical head close to the recording layer to conduct recording or reproducing, a so-called near field optical recording has been noted as means for increasing recording density (Appl. Phys. Lett. 68, p. 141 (1996). In this recording method, a head having a solid immersion lens (hereinbelow, referred to as SIL) is used to reduce the spot size of laser beams, whereby the reproducing is possible with marks which is shorter than the limit in the conventional recording technique determined by a laser wavelength ($\lambda$) of a light source (~$\lambda$/2NA where NA represents a numerical aperture of objective lens), and recording or reproducing can be realized at a super high recording density.

In the near field optical recording, it is necessary to bring the optical head closer to the recording medium (200 nm or less). Accordingly, unlike the conventional magneto-optical recording medium to which laser beams are irradiated to the recording layer through the substrate, a method for irradiating directly laser beams to the recording layer without passing through the substrate, is used (surface-readout type recording). In this case, use of a flying type slider head is proposed in order to bring SIL head closer to the recording layer.

In an attempt of continuous tests for recording and reproducing near field optical recording media by using the above-mentioned SIL head by the inventors of this application, there has been found that when recording is continued for a long time, foreign matters deposit on the SIL head whereby recording and reproducing can not be continued.

Further, since the medium surface of the groove is remote from the optical head by the distance corresponding to the depth of the groove in comparison with the medium surface of the land, there is apt to occur the total reflection of laser beams beyond the critical angle on the groove in conducting the recording or the reproducing in the land/groove recording system, hence, light convergence properties become poor, with the result that the recording/reproducing properties of the groove are deteriorated in comparison with the recording/reproducing properties of the land.

It is an object of the present invention to provide an optical recording medium suitable for near field optical recording, which exhibits high reliability in continuous tests for recording and good recording/reproducing characteristics.

It is another object of the present invention to provide an optical recording medium exhibiting sufficient recording/reproducing characteristics even in a land/groove recording system.

SUMMARY OF THE INVENTION

In considering the above-mentioned circumstances, the inventors have made extensive studies on the structure of a recording medium in consideration that the power density is extremely high at a lower surface of the SIL lens and the medium surface, and accordingly, if a substance or a defect which absorbs laser, exists on the medium surface or in an optical path around the lower surface of the SIL head, temperature will rise abruptly to result a foreign matter, and have completed the present invention by providing a transparent protective resin layer having a refractive index $n_p$ of more than NA on the recording layer and determining the diameter of laser beams on the medium surface to be 1.5 $\mu$m or more.

In accordance with the present invention, there is provided a surface-side reproduction type optical recording medium in which at least a recording layer and a transparent protective resin layer having a refractive index $n_p$ of more than the NA are formed on the substrate, and which carries out recording or reproducing with laser beams from an optical head having a numerical aperture NA of more than 1 wherein the optical head is floated from the surface of the medium at a height of λ/4 or less where λ is the wavelength of the laser beams, the surface-side reproduction type optical recording medium being characterized in that the diameter of the laser beams on the medium surface is from 1.5 μm to 30 μm. In a magneto-optical recording medium or a phase-change recording medium in the present invention, it is preferable to form a dielectric layer having a refractive index which is at least 0.4 larger than the NA on the recording layer, and to form the above-mentioned transparent protective resin layer on the dielectric layer.

Further, in accordance with the present invention, there is provided a surface-side reproduction type optical recording medium for carrying out recording or reproducing with laser beams from an optical head having a numerical aperture NA of more than 1 wherein the optical head is floated from the surface of the medium at a height of λ/4 or less where λ is the wavelength of the laser beams, the surface-side reproduction type optical recording medium being characterized in that at least a recording layer and a transparent protective resin layer having a refractive index $n_p$ of more than the NA are formed on the substrate, and the transparent protective resin layer includes ultra-fine particles of inorganic material having a diameter of 0.05 μm or less.

Further, in accordance with the present invention, there is provided a surface-side reproduction type optical recording medium for carrying out recording or reproducing with laser beams from an optical head having a numerical aperture NA of more than 1 wherein the optical head is floated from the surface of the medium at a height of λ/4 or less where λ is the wavelength of the laser beams, the surface-side reproduction type optical recording medium being characterized in that at least a recording layer, a dielectric layer and a transparent protective resin layer having a refractive index $n_d$ of more than the NA are formed on the substrate in this order, and the refractive index $n_d$ of the dielectric layer is 2.4 or more.

Further, in accordance with the present invention, there is provided a surface-side reproduction type optical recording medium for carrying out recording or reproducing with laser beams from an optical head having a numerical aperture NA of more than 1 wherein the optical head is floated from the surface of the medium at a height of λ/4 or less where λ is the wavelength of the laser beams, the surface-side reproduction type optical recording medium being characterized in that a land and a groove are formed in a substrate surface; at least a recording layer and a transparent protective resin layer having a refractive index $n_p$ of more than the NA are formed on the substrate, and the step formed between the land and the groove in the surface of the transparent protective resin layer is λ/30 or less.

DESCRIPTION OF REFERENCE NUMERALS

11, 21, 31, 41, 51, 61, 71, 81, 101, 111: Substrate
42, 52, 62, 72, 102, 112: Reflective layer
73: Lower dielectric layer
12, 22, 32, 43, 53, 63, 74, 82, 103, 113: Recording layer
13, 23, 33, 44, 64, 83, 114: Dielectric layer
54, 75, 104: First dielectric layer
55, 76, 105: Second dielectric layer
14, 34, 45, 56, 65, 77, 84, 106, 115: Transparent protective resin layer
66, 78, 116: First matching layer
67, 79, 117: Second matching layer
46, 57, 68, 80, 107, 118: Liquid lubricant layer
15, 24, 85: Air gap
16, 25, 86: SIL head
17, 26, 87: Laser beam (Incident light)
18, 27: Focus
36: Diameter L1 of laser beams at the interface between a dielectric substance and a transparent protective resin layer
37, 90: Diameter L2 of laser beams on the medium surface
88: Convex portion at a lower surface of SIL head
89: The size of convex portion
91: Coil

DETAILED DESCRIPTION OF THE PREFERRED EMBODIMENTS

In the following, the present invention will be described with reference to the drawings.

Figure 1:
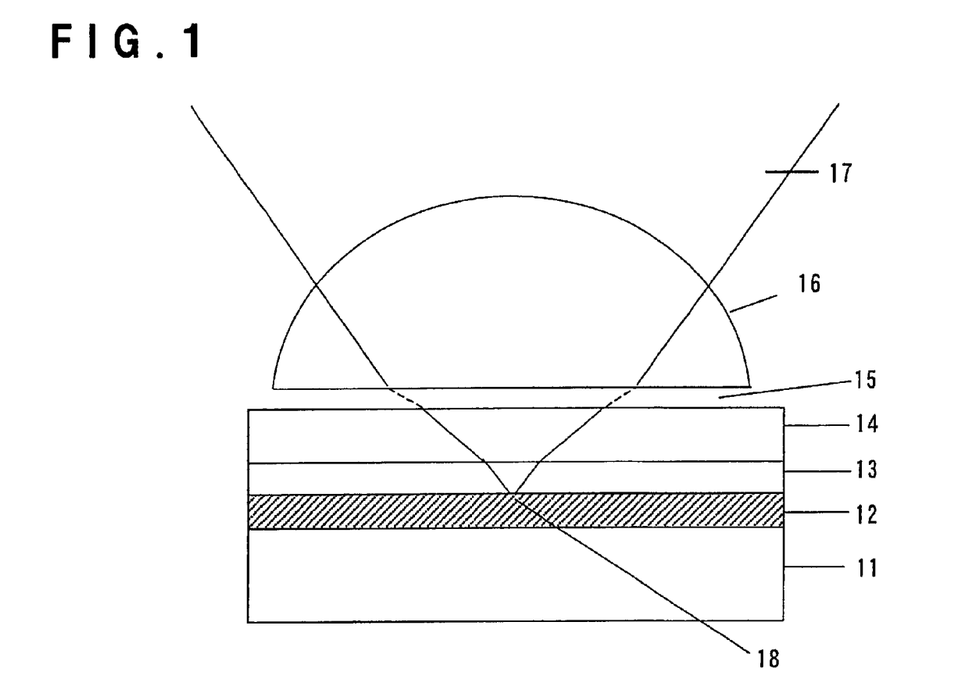
FIG. 1 is a diagram shown in cross-section of an embodiment of the surface-side reproduction type optical recording medium according to the present invention wherein a SIL head is in a state of flying.

FIG. 1 shows diagrammatically in cross section an embodiment of the surface-side reproduction type optical recording medium of the present invention in a state that a SIL head 16 flies. On the substrate 11, a recording layer 12, a dielectric layer 13 and a transparent protective resin layer 14 are laminated. Laser beams 17 incident through an objective lens (not shown) to the SIL head 16 reach the medium surface via an air gap 15.

Laser beams having an angle exceeding the critical angle ($\sin^{-1}(1/n_{SIL})$) on a lower surface of the SIL head 16 (having a numerical aperture of NA and a refractive index of $n_{SIL}$) pass through the air gap 15 keeping a phase of wavelength of ¼ and reach the medium surface due to a near field effect.

Figure 3:
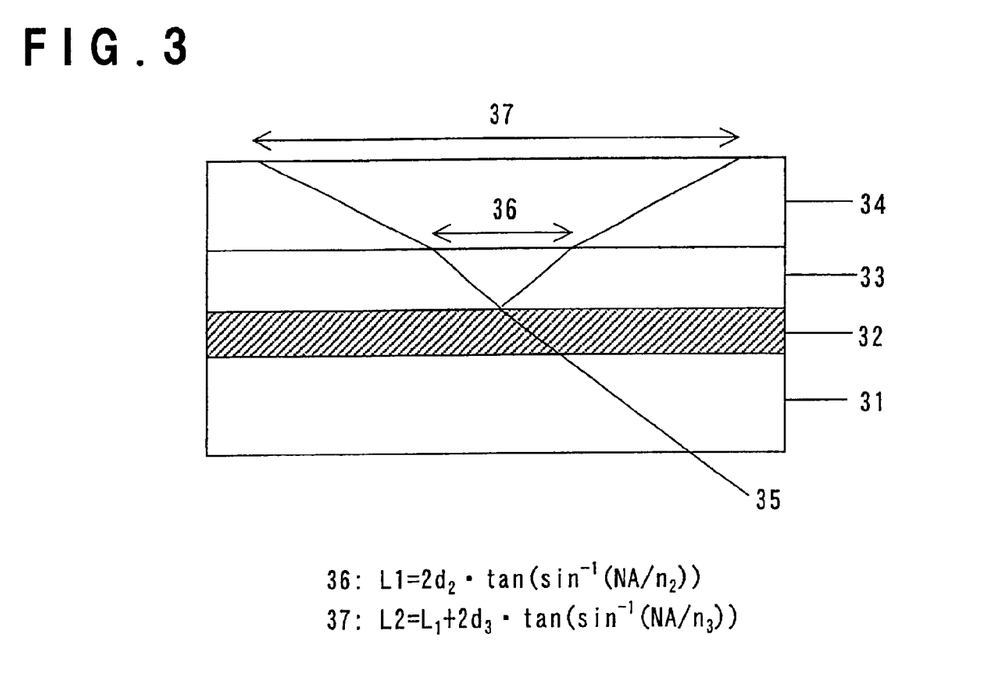
FIG. 3 is an enlarged cross-sectional view of FIG. 1, showing a state that light is incident.

The laser beam 17, which have reached the medium surface, transmits through the transparent protective resin layer 14 and the dielectric layer 13 to reach the recording layer 12, at which the laser beams form a focus 18. In the present invention, the diameter L2 (numeral 37 in the drawing) of the laser beams 17 on the medium surface as shown in FIG. 3 is defined as $L2=L1+2d_3 \cdot \tan(\sin^{-1}(NA/n_3))$ from the Snelle's law by using the diameter $L1=2d_2 \cdot \tan(\sin^{-1}(NA/n_2))$ of the laser beams 17 at the interface of the dielectric layer (refractive index n2 and layer thickness $d_2$) and the transparent protective resin layer (refractive index $n_3$ and layer thickness $d_3$) Here, the size of the laser beams 17 at the focus 18 generally has a value of $\lambda/NA$, and it is said that it has a space of about $\lambda/NA^2$ in a direction of the depth. However, in the present invention, since a point-like focus was formed on an upper surface of the recording layer as described above, the geometrical size L2 on the medium surface, which is primarily determined by the dielectric substance, the transparent protective resin layer, the air gap and the structure of the SIL head, was taken as the diameter of the laser beams on the medium surface.

When $\lambda/NA<L2$ is obtainable, such value can be considered to be substantially coincident with the diameter. In order to collect light in a groove to the extent of a size of $\lambda/NA$, it is preferred to make the recesses and projections by lands and grooves in the medium surface flat to be $\lambda/30$ or less.

The optical head used in the present invention is such one having a lens capable of collecting light by using a near field effect in the same manner as SIL so that NA is larger than 1, such as an ultra-hemi SIL, SIM (Solid Immersion Mirror) including a reflection mirror or the like, other than a so-called hemispherical SIL.

Figure 2:
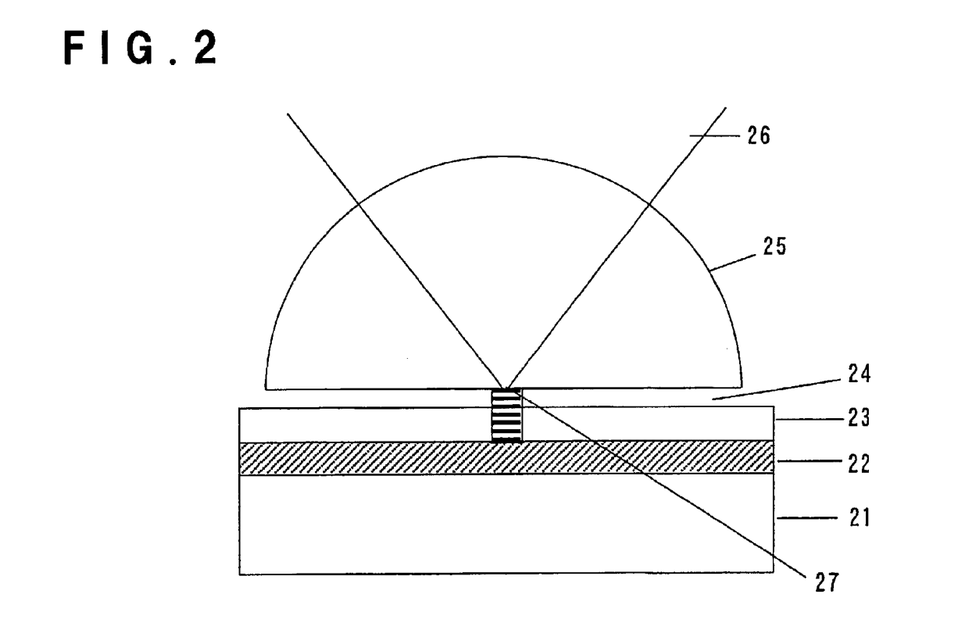
FIG. 2 is a diagram shown in cross-section of an example of a conventional surface-side reproduction type optical recording medium wherein a SIL head is in a state of flying.

FIG. 2 is a diagram in cross section of an example of a conventional surface-side reproduction type optical recording medium in a state that a SIL head flies. Since the size of laser beams was $\lambda/NA>L2$ in the conventional technique, the focus 27 of the laser beams was considered to be at a lower surface of the SIL head, and laser beams of $\lambda/NA$ reached the recording layer 22 via the medium surface due to the near field effect, whereby the diameter of the laser beams on the medium surface was about $\lambda/NA$.

In the medium of the present invention, it is possible to form a diameter of laser beams of 1.5 μm or more on the medium surface by adjusting the refractive index and the thickness of each of the dielectric layer and the transparent protective resin layer. Accordingly, the density of power on the medium surface decreases whereby an unusual temperature rise of a foreign matter or a defect caused by a laser power can be prevented.

Figure 8:
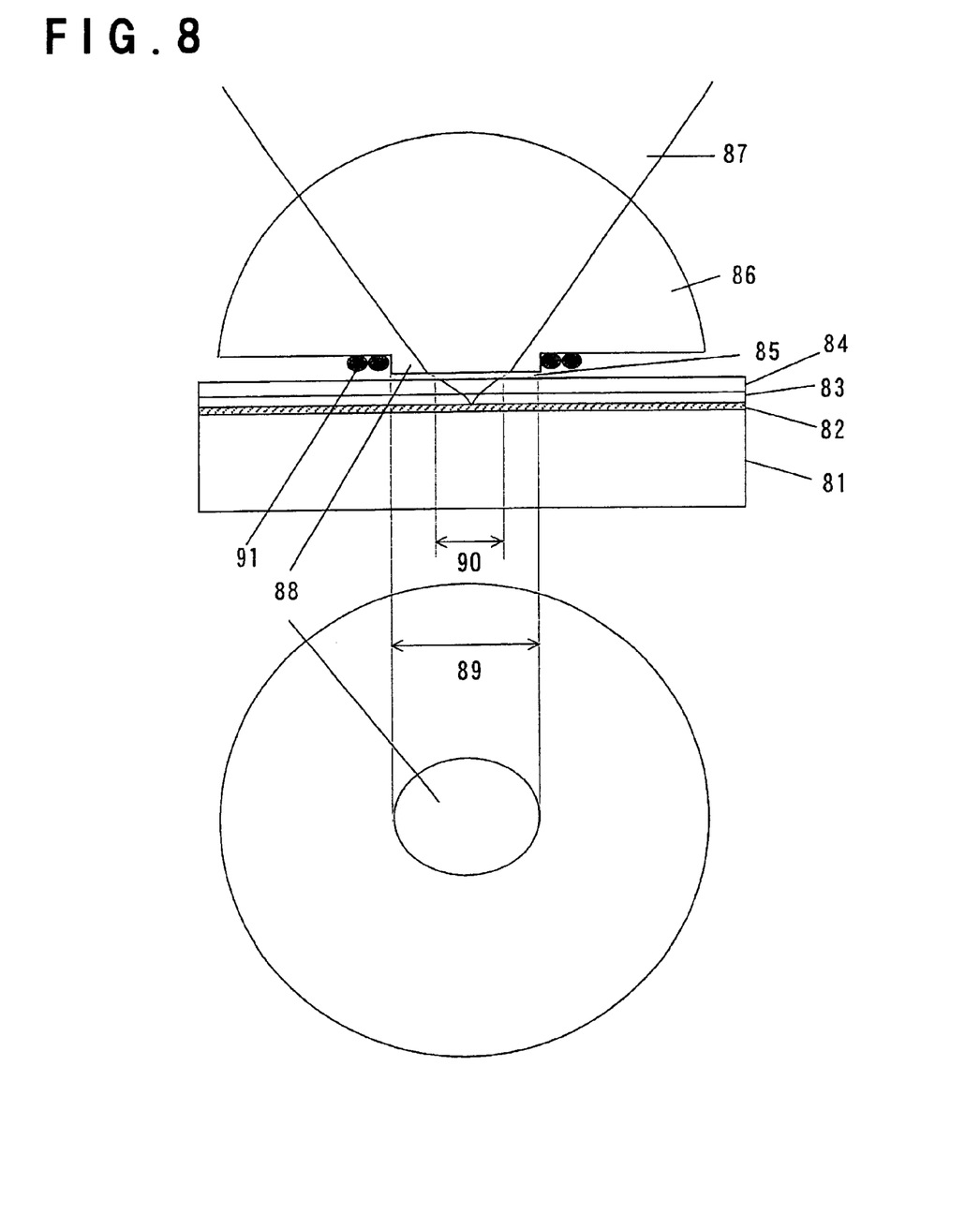
FIG. 8 is a diagram in cross section of an embodiment of the surface-side reproduction type optical recording medium of the present invention, showing a state that a SIL head having a convex portion at its lower surface flies.

In a system for conducting recording or reproducing to the medium of the present invention, a projection 88 of a generally circular shape or an elongated circular shape having a size of 60 μm or less and having its center in substantially coincident with the center of the optical head is formed in a lower surface of the optical head as shown in FIG. 8; the focus of the laser beams is at a distance of at most $\lambda/NA^2$ from the recording layer 82, and the aberration by the thickness of the protective layer 84 can be corrected by the adjustment of an optical element such as the shape of an objective lens or a SIL lens.

The formation of the projection 88 reduces a possibility of contacting a portion forming the optical path in the optical head with the medium even when there is an inclination of the optical head or the medium. In order to conduct recording or reproducing by using such optical head, it is necessary to introduce laser beams to the projection 88, and further, to swing for tracking the beams in the projection 88. For this, it is preferable that the diameter of the laser beams on the medium surface is 30 μm or less.

Further, in magneto-optically recording, it is preferable to provide a coil 91 around the projection in a lower surface of the optical head in order to perform the recording under magnetic field modulation. In this case, the narrower the area of the projection 88 is, the smaller the size of the coil 91 is. Accordingly, it is possible to modulate at a high speed, whereby the density of recording and the transferring rate can be improved.

Figure 4:
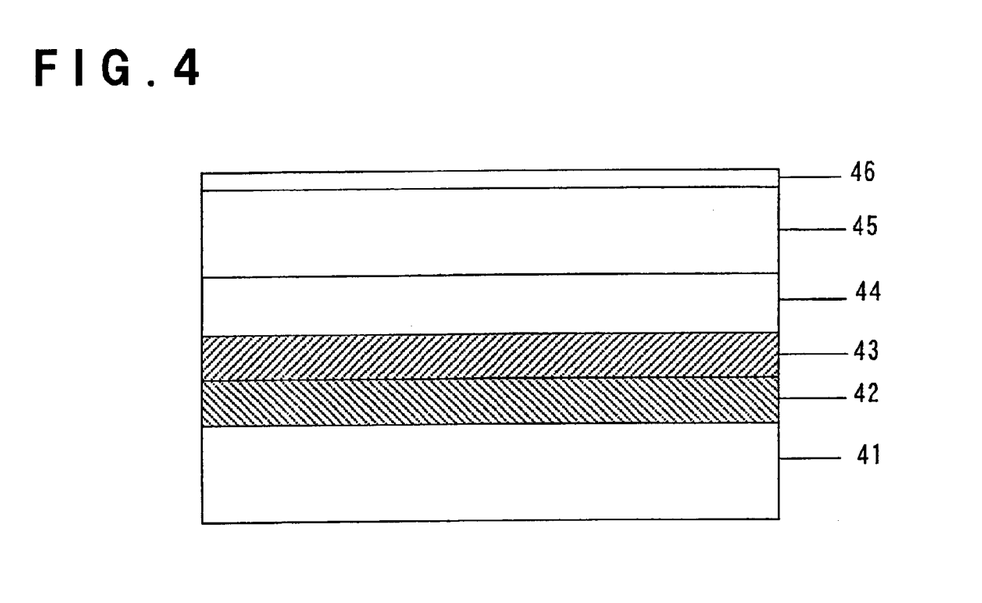
FIG. 4 is a partially cross-sectional view of an embodiment of the optical recording medium of the present invention having a structure of substrate/reflective layer/recording layer/dielectric layer/transparent protective resin layer/liquid lubricant layer.

FIG. 4 is a partially cross-sectional view of an embodiment of the optical recording medium according to the present invention. On the substrate 41, a reflective layer 42, a recording layer 43, a dielectric layer 44, a transparent protective resin layer 45 and a liquid lubricant layer 46 are laminated.

For the substrate 41, there is in particular no limitation as far as the substrate satisfies the properties as the medium substrate such as a mechanical property, and glass, polycarbonate, amorphous polyolefin, engineering plastics and so on may be used.

A groove and a land may be formed in the substrate 41. Conventionally, the groove was formed only for the tracking the optical head, and the recording or reproducing of information was conducted to the land as a recording region. However, the groove has taken part in recording or reproducing information with an increase of demand of making the recording density high. The surface-side reproduction type optical recording medium of the present invention is applicable not only to the land recording system as in the conventional technique but also a groove recording system wherein information is recorded in the groove or a land/groove recording system wherein information is recorded in both the land and the groove.

In the groove recording system, a substrate in which a groove having a broader width than the land may be used. In the land/groove recording system, the ratio of the groove to the land in the full width at half maximum (land width/groove width) is preferably from 0.5 to 1.5, more preferably, from 0.8 to 1.1.

The depth $d_G$ of the groove in the substrate is preferably $\lambda/(14n_{OC}) \leq d_G \leq \lambda/(5n_{OC})$ where $n_{OC}$ is the refractive index of the transparent protective resin layer. When $d_G$ is from $\lambda/(7n_{OC})$ to $\lambda/(5n_{OC})$, crosstalking in the land and the groove can be reduced. When dG is from $\lambda/(14n_{OC})$ to $\lambda/(7n_{OC})$, the phase of returning light from the land is largely different from that from the groove. Accordingly, crosstaking can be reduced by adjusting independently the phase between the land and the groove in the optical system.

When the pitch of the land and the groove is 0.7 $\lambda/NA$ or more, crosstalking is not so large. Accordingly, the linear recording density can be increased by reducing the depth of the groove as far as the tracking is permissible.

For the reflective layer 42, a material exhibiting a high reflectance to a laser wavelength used, such as a noble metal, Cu, Al or the like, is used. The reflective layer may be formed by using an alloy of these metals or an alloy of one of these metals and another metal in order to assure durability. Further, when the thickness of the recording layer 43 is sufficiently large, the reflective layer 42 may be eliminated.

The recording layer 43, when it is for magneto-optically recording, is made of a layer of amorphous rare earth transition metal having a large perpendicular magnetic anisotropy such as TbFeCo, TbDyFeCo, NdDyFeCo or the like, or an artificial layer of Pt/Co or the like. The thickness of the recording layer 83 is preferably from 10 nm to 200 nm. When the recording layer is used as a single layer, the thickness of the recording layer 43 is more preferably from 15 nm to 40 nm in consideration of SNR. The recording layer 43 is not always necessary to be a single layer but it may be a lamination with a layer for increasing sensitivity to a magnetic field for recording, such as a GdFeCO layer, or a lamination with an interlayer or a reproduction layer of high magnetic resolution. The recording layer 43 may be added with an anticorrosion element such as Cr, Ti, Zr, NB, Ta or the like to increase anticorrosion properties, or added with several atomic % of Nd in order to increase the Kerr rotation angle in a short wavelength.

Further, in a case of phase-change recording, the recording layer 43 is made of a material such as GeSbTe, AgInSbTe or the like wherein the optical constant changes between crystalline and amorphous. The thickness of the recording layer 43 is preferably from 10 nm to 40 nm.

Further, in a case of a write-once type recording medium, the recording layer 43 is made of a layer including dye such as cyanine, phthalocyanine, naphthalocyanine or the like, which may be formed by spin coating.

In a case of magneto-optical recording or phase-change recording, it is preferable to form on the recording layer 43 a transparent layer 44 of a dielectric material such as AlN, SiN, GeN, $Ta_2O_5$, ZnS—$SiO_2$ or the like. The thickness of the dielectric layer 44 is determined so as to increase the output signals from recorded marks, and is preferably determined in a range of from about 10 to 1000 nm. When the refractive index of the dielectric layer 44 is larger, a larger effect of increasing signals for reproducing due to multiple reflection is obtainable. Further, since there is a small difference between the refractive index of the dielectric layer 44 and the reflective index of the recording layer 40, light can easily be introduced into the recording layer 43 whereby a high output can be obtained. Therefore, it is preferable that the refractive index of the dielectric layer 44 is at least 0.4 larger than the NA of the SIL head, and it is more preferable that the refractive index is at least 0.3 higher than the refractive index of the transparent protective resin layer.

In order to intensify signals for reproducing due to multiple reflection, the thickness of the dielectric layer is preferably less than the extent $\lambda/NA^2$ of laser beam converged into the recording layer in the direction of the depth.

Further, in consideration that the effect of intensifying signals for reproducing due to multiple reflection is large as the direction of propagation of light in the dielectric layer approaches a direction perpendicular to the layer surface, and the refractive index of the transparent protective resin layer is about from 1.3 to 1.9, it is preferable that the refractive index $n_d$ of the dielectric layer is 2.4 or more.

As a material for such dielectric layer, it is preferable to use (1) at least one substance selected from ZnS, $Nb_2O_5$ and $TiO_2$; (2) a substance having a composition represented by $(MA)_1(MB)_2O_6$ wherein MA is at least one substance selected from Mg, Ca, Sr and Ba, and MB is at least one substance selected from V, Nb and Ta, which is a double oxide and (3) a Perovskite compound or the like. In the case of the substance having a composition represented by (MA)$_1$(MB)$_2$O$_6$ wherein MA:MB:O=1:x:y (atomic ratio), x and y are not always required strictly to be x=2 and y=6, and it may be such one having a composition represented generally by $(MA)_1(MB)_2O_6$. Further in the case of the Perovskite compound, it may not always be composed only of the Perovskite compound, and it may be a material containing at least 80% by weight of Perovskite compound.

The transparent protective resin layer 45 is composed of a transparent polymer such as polyvinylidene chloride, polychlorostyrene, polyvinyl benzoate, polyacrylate, polyvinyl acetate, polydimethylsiloxane, polyethylene fluoride or the like, or a copolymer thereof. These polymers can be formed by adding to a monomer for such material a photopolymerization initiator, a leveling agent, a heat stabilizer and other materials for adjusting hardness, viscosity and so on; coating the monomer by, e.g., spin-coating, followed by irradiating ultraviolet rays for polymerization, or by spin-coating a liquid obtained by dissolving such polymer with a solvent, or by bonding a polymer sheet with an adhesive.

Among these materials, a material composed mainly of a polyacrylate obtained by photopolymerization of an acrylate derivative is particularly preferable from the viewpoint of hardness, photopolymerization rate and so on. Here, as the number of functional groups of the monomer is large, the hardness of the transparent protective resin layer obtained by the photopolymerization increases. However, it is preferable to use as the main component a monofunctional, bifunctional or trifunctional acrylate derivative described hereinbelow solely or in a mixture thereof, in consideration of the property of becoming brittle.

As a monofunctional (meth)acrylate derivative, tetrahydrofurfuryl acrylate, tetrahydrofurfuryl methacrylate, 2-acryloyloxyethyl-2-hydroxypropyl phthalate, 2-methacryloyloxyethyl-2-hydroxypropyl phthalate, phenoxyethyl acrylate, phenoxyethyl methacrylate or the like, may be mentioned.

As a bifunctional (meth)acrylate derivative, ethylene glycol diacrylate, ethylene glycol dimethacrylate, 1,3-propanediol diacrylate, 1,3-propanediol dimethacrylate, 1,4-butanediol diacrylate, 1,4-butanediol dimethacrylate, 1,5-pentandioldiol diacrylate, 1,5-pentandioldiol dimethacrylate, 1,6-hexanediol diacrylate, 1,6-hexanediol dimethacrylate, 1,7-heptanediol diacrylate, 1,7-heptanediol dimethacrylate, 1,8-octanediol diacrylate, 1,8-octanediol dimethacryate, 1,9-nonanediol diacrylate, 1,9-nonanediol dimethacrylate, 1,10-decanediol diacrylate, 1,10-decanediol dimethacrylate, diacrylate or dimethacrylate derived from polyethylene glycol having an average molecular weight of from 200 to 600, bis(hydroxymethyl)-tricyclo[5.2.1.02,6] decandiacrylate, bis(hydroxymethyl)-tricyclo[5.2.1.02,6] decandimethacrylate, diacrylate of ethylene oxide adduct of bisphenol A, dimethacrylate of ethylene oxide adduct of bisphenol A or the like, may be mentioned.

As (meth)acrylate derivative having three or more functional groups, pentaerythritol triacrylate, pentaerythritol trimethacrylate, trimethylolpropane triacrylate, trimethylolpropane trimethacrylate, bis(hydroxymethyl)-tricyclo [5.2.1.02,6]decanetriacrylate, bis(hydroxymethyl)-tricyclo [5.2.1.02,6]decanetrimethacrylate, dipentaerythritol hexaacrylate, dipentaerythritol hexamethacrylate or the like, may be mentioned.

In order to obtain a stable flying state of the optical head, a front surface of the transparent protective resin layer 45 is preferably harder, e.g., at HB or more in pencil hardness. When the refractive index of the transparent protective resin layer 45 is low, the size of laser beams is apt to become large. However, if it is too low, light at a high incident angle can not reach the inside of the transparent protective resin layer.

Accordingly, the refractive index is preferably NA or more but less than NA+0.4.

In order to increase the hardness of the transparent protective resin layer, it is preferable that ultra-fine particles of inorganic material are contained in the transparent resin of the protective layer. For example, powder in a nanometer size, or a sol or gel material of silicon dioxide or aluminum oxide may be incorporated into a resin material which cures by the above-mentioned ultraviolet rays. In order to prevent optically scattering, the refractive index of the ultra-fine particles of inorganic material should be close to that of the resin as possible, or the particle size be 0.05 μm or less, or the dispersion property be higher.

When the ultra-fine particles of inorganic material are fine particles of transparent electric conductive material such as ITO, $SnO_2$: Sb, it is possible to avoid the absorption of foreign matters caused by an electrostatic force.

Further, when the above-mentioned ultra-fine particles of inorganic material are those of aluminum oxide, aluminum nitride, boron nitride, silicon carbide, beryllium oxide or diamond, a heat dissipation property of the transparent protective resin layer is increased, whereby unusual temperature rise of a foreign matter or a defect caused by the irradiation of laser power can be suppressed.

The thickness of the transparent protective resin layer 45 is preferably determined so as to be $\lambda/NA^2$ or more, and so that the diameter of laser beams on the medium surface is in a range of from 1.5 μm to 30 μm. The determination of the thickness of the transparent protective resin layer 45 to be $\lambda/NA^2$ or more can reduce the interference of laser beams in the transparent protective resin layer 45.

Further, by providing the transparent protective resin layer 45, the recesses and projections in the surface of the optical recording medium, formed by the land and the groove in the substrate can be moderated, and the distance between the front surface of the medium having the land and the groove and a lower surface of the optical head can substantially be constant. Here, when $\Delta t \leq \lambda/NA^2$ where $\Delta t$ represents the unevenness of the thickness of the transparent protective resin layer in a recording region, the distribution of layer thickness can be within a range of the depth of the focus. Accordingly, it is preferable because a driving mechanism can be formed without using a complicated focus servo unit by controlling correctly the flying height by contriving the shape of the slider to obtain excellent flying characteristics to the medium. Here, the unevenness of the layer thickness means the difference between the maximum value and the minimum value of the layer thickness in the recording region.

The liquid lubricant layer 46 is made of a lubricant such as perfluoroether, silicon oil or the like which copes with an instantaneous contact between the head and the medium possibly occurring in the system having a flying head. The thickness of the liquid lubricant layer 46 is preferably from 0.2 nm to 5 nm.

In a case that the front surface of the optical recording medium of the present invention is made of the transparent protective resin layer 45 or a matching layer made of a resin layer which is described later, the medium surface may have lubricating properties by incorporating a fluorine type lubricant or a fluorine type surfactant in the resin layer.

In order to collect laser beams in the recording layer 43 to have a size of about $\lambda/NA$, it is preferable that light at a high incident angle reaches the recording layer 43 without causing any reflection in the optical path. Here, light at a high incident angle means light incident at a angle of NA>1, and corresponds to an outer side portion in the observation of returning light at an eye level with a CCD camera. In this case, the brightness of the outer side portion of light is preferably the same level as the brightness of an inner side portion of light. When the thickness of the dielectric layer 44 is less than $\lambda/NA^2$ and the thickness of the transparent protective resin layer 45 is $\lambda/NA^2$ or more, it is preferable that the reflection of light at the dielectric layer 44 and the transparent protective resin layer 45 and the reflection of light at the transparent protective resin layer 45 and the air gap are respectively small.

When the dielectric layer 44 and the transparent protective resin layer 45 are respectively used as a single layer as shown in FIG. 4 wherein the above-mentioned conditions are satisfied, they preferably have about (2 m+1) $\lambda/4$ and n $\lambda/2$ in terms of optical layer thickness respectively where m and n are integers of 0 or more. When the thickness of the transparent protective resin layer 45 is sufficiently larger than $\lambda/NA_2$, optical interference from upper and lower sides of the transparent protective resin layer decreases. Accordingly, the thickness of the transparent protective resin layer is not always necessary to satisfy such conditions. However, when optical interference from upper and lower sides of the transparent protective resin layer is negligible, it is preferred to form the matching layer on the transparent protective resin layer so that reflection of light at the interface between the transparent protective resin layer and the air gap is reduced as described later.

Further, when a lower dielectric layer composed of a material such as AlN, SiN, GeN, $Ta_2O_5$, ZnS—$SiO_2$ or the like is provided between the recording layer 43 and the reflective layer 42, an antireflection effect at the interface between the transparent protective resin layer and the dielectric layer can be increased.

Further, it is preferable that the reflection of light can further be reduced by decreasing stepwisely or continuously the refractive index of the dielectric layer toward the medium surface. The refractive index of the dielectric layer, which varies depending on wavelength and conditions of manufacture, is approximately 1.5–1.9 in SiON, 2.0 in AlN, 2–2.1 in SiN and 2.2 in ZnS—$SiO_2$ for example. By laminating these in two or more layers or by changing continuously the layer forming speed in a simultaneously sputtering method, a medium exhibiting excellent low reflection property to light at a high incident angle can be obtained. As the minimum unit of the step, about $\lambda/4$ is preferred. However, if a material having an appropriate refractive index cannot be obtained, it is possible to use a lamination with a layer having a thickness smaller than $\lambda/4$ and a different refractive index.

The above-mentioned hemispherical SIL, super-hemispherical SIL or SIM is preferably formed by using glass having a high refractive index of 1.7 or more. In this case, however, reflection of light is apt to occur even when the value of the air gap is 0 because there is a difference of refractive index with respect to the transparent protective resin layer. Further, when reflection light from the dielectric layer returns exceeding the distance causing possible interference in the transparent protective resin layer, the reflection of light from the medium surface can not be suppressed even when the adjustment of the thickness or the gradient of the refractive index of the dielectric layer is conducted. Accordingly, it is preferable to control the reflection at the medium surface by forming the matching layer on the transparent protective resin layer in order to obtain optical matching to laser light.

As conditions for the matching layer, it is preferable that the refractive index of the matching al layer is NA or more, and the refractive index is increased stepwise or continuously from the uppermost layer of the matching layer toward the transparent protective resin layer. Further, it is preferable that the refractive index of the matching layer is NA or more; the refractive index is increased stepwise or continuously from the uppermost layer of the matching layer toward a side of the transparent resin layer, and then, the refractive index is decreased stepwise or continuously, so that the reflectivity can further be reduced. In the case of the refractive index of matching layer being in a range of NA or more, the refractive index of a portion of the matching layer in contact with the transparent protective resin layer may be lower than the refractive index of the transparent protective resin layer. In order to further reduce the reflectivity, a vertical change in the refractive index may be repeated. As the minimum unit of the step, about $\lambda/4$ is preferred. However, when a material having an appropriate refractive index can not be obtained, it is possible to use a lamination with a layer having a thickness smaller than $\lambda/4$ and a different refractive index.

The matching layer is made of a dielectric substance such as $SiO_2$, $SiON$, $AlN$, $SiN$, $GeN$, $Ta_2O_5$, $ZnS$—$SiO_2$ and so on, which have various refractive indices, or a laminated layer of these substances.

A part of or the entirety of the matching layer may be made of a transparent resin. For example, a medium which satisfies good low reflectivity to light at a high incident angle can be obtained by using polyvinylidene chloride having a refractive index of about 1.63, polychlorostyrene of about 1.61, polyvinyl benzoate of about 1.57, polymethylmethacrylate of about 1.49, polyvinyl acetate of about 1.47, polydimethylsiloxane of about 1.40 or polyethylene fluoride of about 1.35, or by combining two or more layers of these polymers.

In order to increase the hardness of the transparent resin in the matching layer, it is preferable that ultra-fine particles of inorganic material having a particle size of at most 0.05 μm are contained in the transparent resin.

In order to obtain such low reflectivity at a high incident angle, it is preferable that the distribution in the thickness of the transparent protective resin layer is within ±40 nm with respect to the optimum condition. In this case, however, a permissible range of the thickness of the transparent protective resin layer can further be broadened when the matching layer is formed, and its layer structure and the refractive index are adjusted so that the reflection of light at the interface between the dielectric layer and the transparent protective resin layer becomes sufficiently small.

There is a tendency that the direction of polarization of laser beams focused on a medium is slightly larger than a direction perpendicular to the polarization. In the method for reproducing the surface-side reproduction type optical recording medium of the present invention, it is possible to obtain good linear recording density by directing the polarized plane of the laser beams vertically with respect to the groove, and to increase the track density in the land/groove recording according to the present invention.

Further, in the optical system wherein the phase of returning light can be adjusted independently for the land and the groove, when the phase adjustment is conducted independently for the land and the groove, the reproduction of signals having a smaller crosstalk and a high SNR is obtainable. In this case, it is preferable that the depth of the groove satisfies $\lambda/(14n_{OC}) \leq d_G \leq \lambda/(7n_{OC})$ as described before.

EXAMPLES

In the following, concrete examples according to the present invention will be described. Surface-side reproduction type optical recording media were prepared in each Example and Comparative Example, and evaluation was made by floating a SIL head having a laser wavelength $\lambda=685$ nm, NA=1.3 and a refractive index of 2.0 wherein $\lambda/NA^2=405$ nm. The layer thickness in each Example and Comparative Example indicates the layer thickness of each optical recording medium, to which measurement is conducted with the SIL head, around a central area in a radial direction of a recording region.

Example 1

Surface-side reproduction type optical recording media having the structure as shown in FIG. 4 were prepared. On each substrate 41 made of polycarbonate, with a guide groove (a groove) having a track pitch of 0.4 μm, a reflective layer 42 composed of $Ag_{98}Pd_1Ti_1$ was formed in a thickness of 40 nm by a DC sputtering method. On this, a recording layer 43 composed of TbFeCo was formed in a thickness of 20 nm by a DC sputtering method. On this, a dielectric layer 44 composed of SiN having a refractive index of 2.1 was formed in a thickness of 230 nm by a reactive DC sputtering method using a Si target in the atmosphere of a mixture of an Ar and $N_2$.

On this, an ultraviolet-curable resin monomer, which was prepared by adding a photopolymerization initiator, a leveling agent and so on to a mixture of acrylate derivatives comprising tetrahydrofurfuryl acrylate, 1,6-hexanediol diacrylate and pentaerythritol triacrylate in a weight ratio of 1:1:4 as the main component, was coated by a spin coating method followed by polymerizing it by irradiating ultraviolet rays, whereby a transparent protective resin layer having a refractive index of 1.5 was formed.

On this, a perfluoropolyether type liquid lubricant layer 46 was coated in a thickness of 2 nm by a lifting method. Thus, the surface-side reproduction type optical recording media were prepared wherein three kinds of optical layer thickness of 480, 600 and 940 nm were provided respectively as the transparent protective resin layers 45.

In recording and reproducing these media by using a laser wavelength $\lambda$ of 685 nm, the optical layer thickness (the actual layer thickness×the refractive index) of each dielectric layer was 0.71$\lambda$, and the transparent protective resin layers indicated optical layer thicknesses of 1.05$\lambda$, 1.31$\lambda$, and 2.06$\lambda$ with respect to the layer thicknesses of 480, 600 and 940 nm respectively. The diameter of laser beam on the medium surfaces indicated 2.0, 2.4 and 3.6 μm with respect to layer thicknesses of transparent protective resin layer of 480, 600 and 940 μm.

Comparative Example 1

A surface-side reproduction type optical recording medium was prepared by the same method as in Example 1 except that instead of the transparent protective resin layer 45, a solid lubricant layer composed of diamond-like carbon (DLC) having a refractive index of 2.0 was formed in a thickness of 20 nm by a reactive RF sputtering method using a C target in the atmosphere of a mixture of AR and $H_2$. The diameter of laser beams on the medium surface of the medium was 0.40 μm.

Comparative Example 2

A surface-side reproduction type optical recording medium was prepared by the same method as in Example 1 except that the thickness of the transparent protective resin layer 45 was 250 nm. The optical layer thickness of the transparent protective resin layer in the medium was 0.55λ, and the diameter of laser beams on the medium surface was 1.2 μm.

Example 2

Figure 5:
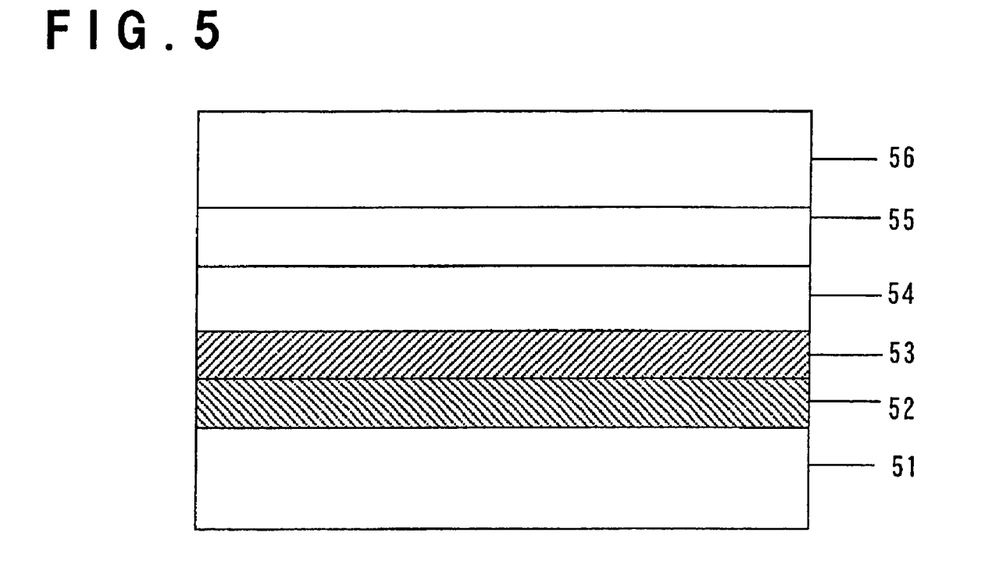
FIG. 5 is a partially cross-sectional view of an embodiment of the optical recording medium of the present invention wherein the dielectric layer comprises two layers of a first dielectric layer and a second dielectric layer.

Surface-side reproduction type optical recording media having the structure as shown in FIG. 5 were prepared. In this Example, the refractive index of the dielectric layers was stepwise decreased toward the medium surface.

On each substrate 51 made of polycarbonate, with a guide groove having a track pitch of 0.4 μm, a reflective layer 52 composed of $Ag_{98}Pd_1Ti_1$ was formed in a thickness of 40 nm by a DC sputtering method. On this, a recording layer 53 composed of TbFeCo was formed in a thickness of 20 nm by a DC sputtering method. On this, a first dielectric layer 54 composed of SiN having a refractive index of 2.1 was formed in a thickness of 75 nm by a reactive DC sputtering method using a Si target in the atmosphere of a mixture of Ar and $N_2$. On this, a second dielectric layer 55 composed of SiON having a refractive index of 1.8 was formed in a thickness of 175 nm by a RF sputtering method using a SiON target in the atmosphere of a mixture of Ar and a slight amount of $N_2$.

On this, a coating material prepared by adding 0.1 wt % of perfluoropolyether to the same ultraviolet-curable resin monomer as used in Example 1 was coated by a spin coating method, and ultraviolet rays were irradiated for polymerization to form a transparent protective resin layer 56 having a refractive index of 1.5. Thus, the surface-side reproduction type magneto-optical recording media were prepared.

In the media prepared, two kinds of layer thickness of 480 and 940 nm were provided as the transparent protective resin layers 45. In recording and reproducing the media by using a laser wavelength λ of 685 nm, the optical layer thickness in the sum of the first dielectric layer and the second dielectric layer was 0.69λ, and the transparent protective resin layers indicated optical layer thicknesses of 1.05λ and 2.06λ with respect to layer thicknesses of 480 and 940 nm respectively. Further, the diameter of laser beams on the medium surfaces indicated 2.2 and 3.8 μm with respect to layer thicknesses of transparent protective resin layer of 480 and 980 nm respectively.

Example 3

Figure 6:
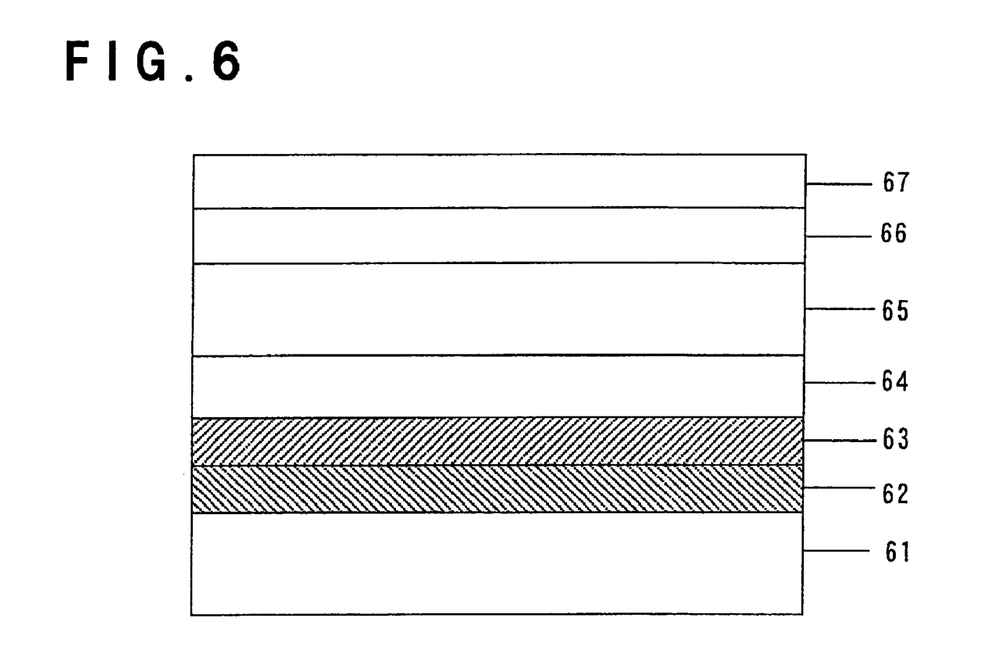
FIG. 6 is a partially cross-sectional view of an embodiment of the optical recording medium of the present invention wherein a first matching layer and a second matching layer are formed on the medium surface.

A surface-side reproduction type optical recording medium having the structure as shown in FIG. 6 was prepared. In this Example, the refractive index of the matching layer was stepwise increased from the medium surface toward the transparent protective resin layer.

On a substrate 61 made of polycarbonate, with a guide groove having a track pitch of 0.4 μm, a reflective layer 62 composed of $Ag_{98}Pd_1Ti_1$ was formed in a thickness of 40 nm by a DC sputtering method. On this, a recording layer 63 composed of TbFeCo was formed in a thickness of 20 nm by a DC sputtering method. On this, a dielectric layer 64 composed of SiN having a refractive index of 2.1 was formed in a thickness of 230 nm by a reactive DC sputtering method using a Si target in the atmosphere of a mixture of Ar and $N_2$. On this, a coating material composed of the same ultraviolet-curable resin monomer as used in Example 1 was coated by a spin coating method followed by irradiation of ultraviolet rays for polymerization, whereby a transparent protective resin layer 65 having a refractive index of 1.50 containing polymethyl methacrylate as the main component was formed in a thickness of 660 nm. On this, a first matching layer 66 having a refractive index of 1.61 containing polychlorostyrene as the main component was formed in a thickness of 110 nm by the same method, and on this, a second matching layer 67 having a refractive index of 1.45 containing methyl methacrylate and polydimethylsiloxane as the main component and 0.1 wt % of a fluorine type surfactant was formed in a thickness of 170 nm to thereby prepare the surface-side reproduction type optical recording medium.

The optical layer thickness of the dielectric layer in the medium was 0.71λ; the optical layer thickness of the transparent protective resin layer was 1.45λ; the optical layer thickness in the sum of the first and second matching layers was 0.62λ, and the diameter of laser beams on the medium surface was 3.6 μm.

Example 4

Figure 7:
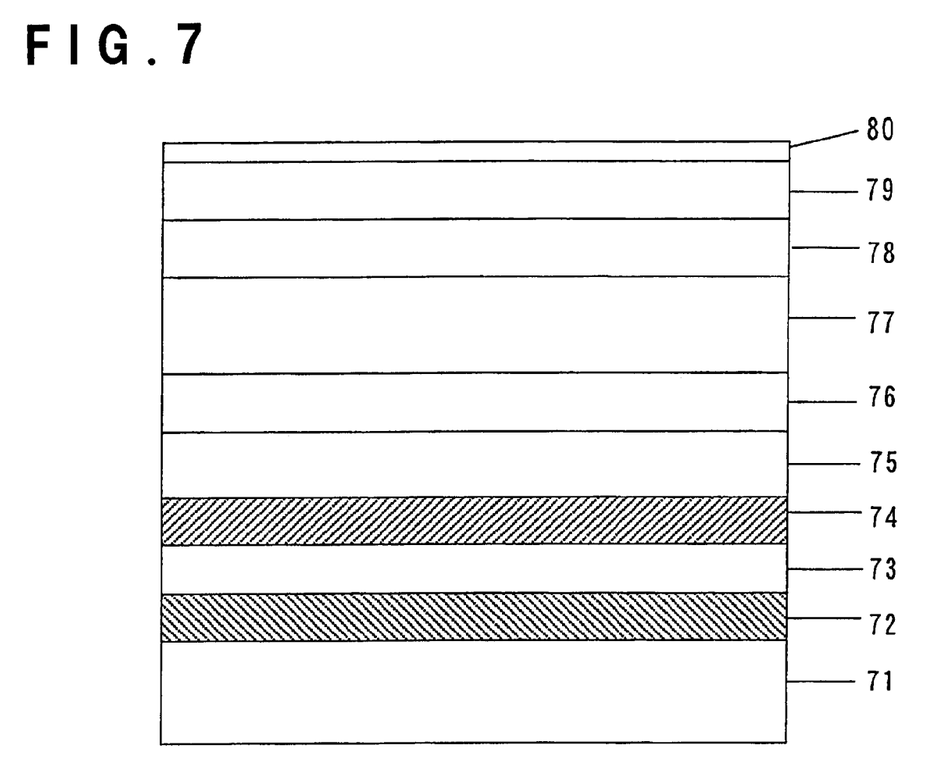
FIG. 7 is a partially cross-sectional view of an embodiment of the optical recording medium of the present invention wherein a lower dielectric layer is formed under the recording layer.

Surface-side reproduction type optical recording media having the structure as shown in FIG. 7 were prepared. On each substrate 71 made of polycarbonate, with a guide groove having a track pitch of 0.4 μm, a reflective layer 72 composed of $Ag_{98}Pd_1Ti_1$ was formed in a thickness of 40 nm by a DC sputtering method. On this, a lower dielectric layer 73 composed of SiAlN having a refractive index of 2.0 was formed in a thickness of 40 nm by a reactive DC sputtering method using a SiAl target in the atmosphere of a mixture of Ar and $N_2$. On this, a recording layer 74 composed of TbFeCo was formed in a thickness of 20 nm by a DC sputtering method. On this, a first dielectric layer 75 composed of SiN having a refractive index of 2.1 was formed in a thickness of 65 nm by a reactive DC sputtering method using a Si target in the atmosphere of a mixture of Ar and $N_2$.

On this, a second dielectric layer 76 composed of SiON having a refractive index of 1.8 was formed in a thickness of 190 nm by a RF sputtering method using a SiON target in the atmosphere of a mixture of Ar and a slight amount of $N_2$. On this, a coating material composed of the same ultraviolet-curable resin monomer as used in Example 1 was coated by a spin coating method, and ultraviolet rays were irradiated for polymerization, whereby a transparent protective resin layer 77 having a refractive index of 1.5 containing polymethyl methacrylate as the main component was formed. Here, 5 kinds of layer thickness of 600, 750, 900, 1050 and 1200 nm were provided as transparent protective resin layers 77.

On each of the transparent protective resin layers 77, a first matching layer 78 composed of SiN having a refractive index of 2.1 was formed in a thickness of 80 nm by a reactive DC sputtering method using a Si target in the atmosphere of a mixture of Ar and $N_2$. On this, a second matching layer 79 composed of $SiO_2$ having a refractive index of 1.45 was formed in a thickness of 165 nm by a RF sputtering method using a $SiO_2$ target. On this, a perfluoropolyether type liquid lubricant layer 80 was coated in a thickness of 2 nm by a lifting method. Thus, the surface-reproduction type optical recording media were prepared.

In recording and reproducing these media by using a laser wavelength λ of 685 nm, the optical layer thickness in the sum of the first and second dielectric layers was 0.70λ, and the transparent protective resin layers 77 indicated optical layer thicknesses of 1.31, 1.64, 1.97, 2.30 and 2.63λ with respect to layer thicknesses of 600, 750, 900, 1050 and 1200 nm respectively. The optical layer thickness in the sum of the first and second matching layers was 0.59λ. Further, the diameter of laser beams on the medium surfaces indicated 3.4, 3.9, 4.4, 4.9 and 5.5 μm with respect to the layer thicknesses of 600, 750, 900, 1050 and 1200 nm respectively.

Each of the surface-side reproduction type optical recording media in Examples 1 to 4 and Comparative Examples 1 and 2 was rotated at a linear velocity of 10 m/s to float a slider SIL head having a laser wavelength of 685 nm and an effective numerical aperture of 1.3 to a height of 70 nm from the thin layer surface. After having been focused to the optimum position on each medium by manual operations, laser was irradiated at a frequency of 84 MHz in a pulse form to heat the main recording layer to the Curie temperature or more, and the magnetic field of a coil on the SIL head was modulated with 21 MHz, whereby 2T signals having a length of mark of 0.24 µm were recorded. Here, the width of modulation of the magnetic field was ±130 Oe.

After the recording, the reproducing was conducted by a laser power of 1 mW, and carrier and noise in a resolution bandwidth of 30 kHz at a frequency of 21 MHz were measured. The ratio of the noise to the carrier was taken as CNR. Further, a CCD camera was located at an eye level in order to observe the state of reflection of light at a high incident angle, and the intensity of reflection light was compared with light at a low incident angle.

TABLE 1

|  | Thickness of protective layer (nm) | State of reflection light at a high incident angle | CNR (dB) | Diameter of laser beams (µm) | Number of times of permitting continuous recording (times) |
|---|---|---|---|---|---|
| Ex. 1 | 480 | ○ | 44 | 2.0 | 20 |
|  | 600 | Δ | 41 | 2.4 | 20 |
|  | 940 | ○ | 43 | 3.6 | 20 |
| Comp. Ex. 1 | Nil | ○ | 45 | 0.4 | 3 |
| Comp. Ex. 2 | 250 | ○ | 44 | 1.2 | 15 |
| Ex. 2 | 480 | ◎ | 45 | 2.2 | 20 |
|  | 940 | ◎ | 44 | 3.8 | 20 |
| Ex. 3 | 660 | ◎ | 45 | 3.6 | 20 |
| Ex. 4 | 600 | ◎ | 46 | 3.2 | 20 |
|  | 750 | ◎ | 45 | 3.7 | 20 |
|  | 900 | ◎ | 46 | 4.3 | 20 |
|  | 1050 | ◎ | 46 | 4.9 | 20 |
|  | 1200 | ◎ | 45 | 5.3 | 20 |

Each of the media indicated good flying characteristics, and there was in particular no recognizable difference between Examples 1 to 4 as well as Comparative Example 2 wherein the transparent protective resin layers were provided and Comparative Example 1 wherein the thin solid lubricant layer was formed instead of the transparent protective resin layer. Table 1 shows a result of measurements on the recording/reproducing characteristics. With respect to the state of reflection light at a high incident angle, Example 1 shows a good result except for the thickness of the transparent protective resin layer being 600 nm. In particular, Example 2 wherein the dielectric layer comprises two or more layers having different refractive indices and Examples 3 and 4 wherein the matching layer is formed on the transparent protective resin layer, provide better results. With respect to CNR, Comparative Examples 1 and 2 wherein the transparent protective resin layer has a smaller thickness provide better results than Example 1. However, as in Examples 2 to 4, good characteristics comparable to Comparative Example 1 could be obtained by forming the dielectric layer comprising two or more layers having different refractive indices, or by providing the matching layer on the transparent protective resin layer.

Then, continuous recording was attempted 20 times at the optimum recording power to 50,000 tracks of each sample, and the number of times of recording in which the continuous tests were completed without causing any deviation from the tracks was recorded.

With respect to the continuous recording, when the diameter of laser beams was 1.5 µm or more, the tests of 20 times could be continued to the last.

Then, the focus was fixed to the medium having the transparent protective resin layer of 900 nm thick in Example 4, and CNR of the media having the transparent protective resin layers of 600, 750, 900, 1050 and 1200 nm was measured. Table 2 shows a result.

From the result, it was confirmed that when the difference between the maximum thickness and the minimum thickness (the unevenness of the layer thickness) of the transparent protective resin layer in a recording region was within $\lambda/NA^2$, recording and reproducing were possible without a focus servo. The optical recording media in Example 4 satisfied such condition.

TABLE 2

| Thickness of protective layer (nm) | CNR (dB) |
|---|---|
| 600 | 41 |
| 750 | 45 |
| 900 | 46 |
| 1050 | 45 |
| 1200 | 40 |

Example 5

A surface-side reproduction type optical recording medium having the structure as shown in FIG. 4 was prepared. on a substrate 41 made of polycarbonate, with a ratio of the groove width to the land width of 1:1, a groove depth of 50 nm and a track pitch (the pitch between a land and a groove) of 0.33 µm, a reflective layer 42 composed of $Ag_{98}Pd_1Ti_1$ was formed in a thickness of 40 nm by a DC sputtering method. On this, a recording layer 43 composed of TbFeCo was formed in a thickness of 20 nm by a DC sputtering method. On this, a dielectric layer 44 composed of SiN having a refractive index of 2.1 was formed in a thickness of 230 nm by a reactive DC sputtering method using a Si target in the atmosphere of a mixture of Ar and $N_2$. On this, a coating material composed of the same ultraviolet-curable resin monomer as used in Example 1 was coated by a spin coating method, followed by irradiation of ultraviolet rays for polymerization, whereby a transparent protective resin layer 45 having a refractive index $n_{OC}$=1.5 and a thickness of 480 nm was formed. On this, a perfluoropolyether type liquid lubricant layer 46 was coated in 2 nm by a lifting method to thereby prepare the surface-side reproduction type optical recording medium.

In recording and reproducing the medium by using a laser wavelength $\lambda$ of 685 nm, the optical layer thickness of the dielectric layer was $0.71\lambda$, and the optical layer thickness of the transparent protective resin layer was $1.05\lambda$. Further, the groove depth in the substrate was $\lambda/(9n_{OC})$. The step by the land and the groove of the substrate at the surface of the medium was 20 nm or less in the measurement with AFM. Further, the diameter of laser beams at the medium surface was 2.0 µm.

Comparative Example 3

A surface-side reproduction type optical recording medium was prepared by the same method as Example 5 except that instead of the transparent protective resin layer 45, a solid lubricant layer composed of diamond-like carbon (DLC) having a refractive index of 2.0 was formed in a thickness of 20 nm by a reactive RF sputtering method using a C target in the atmosphere of a mixture of Ar and $H_2$.

The step by the land and the groove of the substrate at the surface of the medium was 50 nm in the measurement with AFM. The diameter of laser beams at the surface of the medium was 0.40 μm.

Example 6

Figure 9:
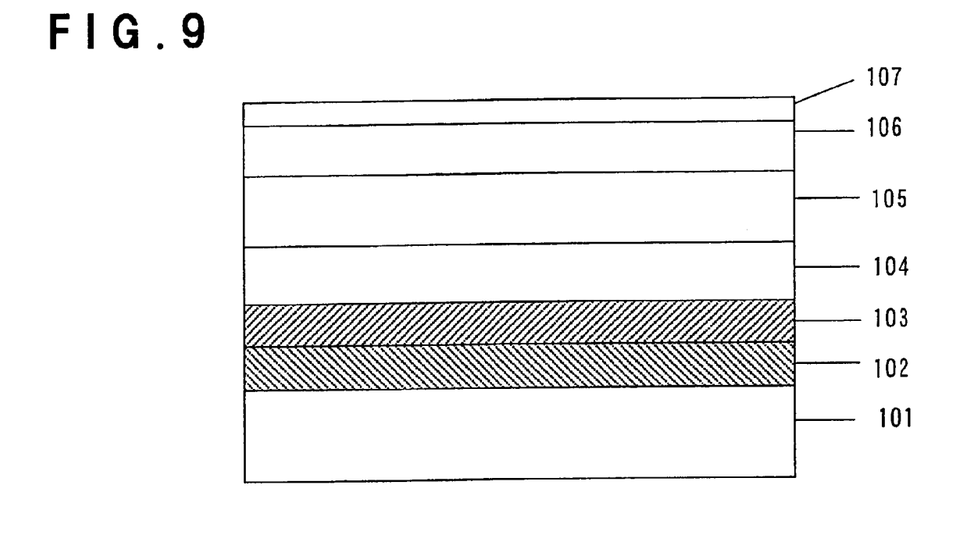
FIG. 9 is a partially cross-sectional view of an embodiment of the optical recording medium of the present invention wherein the dielectric layer comprises two layers of a first dielectric layer and a second dielectric layer, and a liquid lubricant layer is formed on the outermost surface of the medium.

A surface-side reproduction type optical recording medium for near field optical recording having the structure as shown in FIG. 9 was prepared. On a substrate 101 made of polycarbonate, with a ratio of the groove width to the land width of 1:1, a groove depth of 50 nm and a track pitch (the pitch between a land and a groove) of 0.33 μm, a reflective layer 102 composed of $Ag_{98}Pd_1Ti_1$ was formed in a thickness of 40 nm by a DC sputtering method. On this, a recording layer 103 composed of TbFeCo was formed in a thickness of 20 nm by a DC sputtering method. On this, a first dielectric layer 104 composed of SiN having a refractive index of 2.1 was formed in a thickness of 75 nm by a reactive DC sputtering method using a Si target in the atmosphere of a mixture of Ar and $N_2$. On this, a second dielectric layer 105 composed of SiON having a refractive index of 1.8 was formed in a thickness of 175 nm by a RF sputtering method using a SiON target in the atmosphere of a mixture of Ar and a slight amount of $N_2$. On this, a coating material composed of the same ultraviolet-curable resin monomer as used in Example 1 was coated by a spin coating method, followed by irradiation of ultraviolet rays for polymerization, whereby a transparent protective resin layer 106 having a refractive index of 1.5 and a thickness of 480 nm was formed. On this, a perfluoropolyether type liquid lubricant layer 107 was coated in 2 nm by a lifting method to thereby prepare the surface-side reproduction type optical recording medium.

In recording and reproducing the medium by using a laser wavelength λ of 685 nm, the optical layer thickness in the sum of the first dielectric layer and the second dielectric layer was 0.69λ, and the optical layer thickness of the transparent protective resin layer was 1.05λ. Further, the groove depth in the substrate was $\lambda/(9n_{OC})$. The step by the land and the groove of the substrate at the surface of the medium was 20 nm or less in the measurement with AFM. Further, the diameter of laser beams at the medium surface was 2.2 μm.

Example 7

Figure 10:
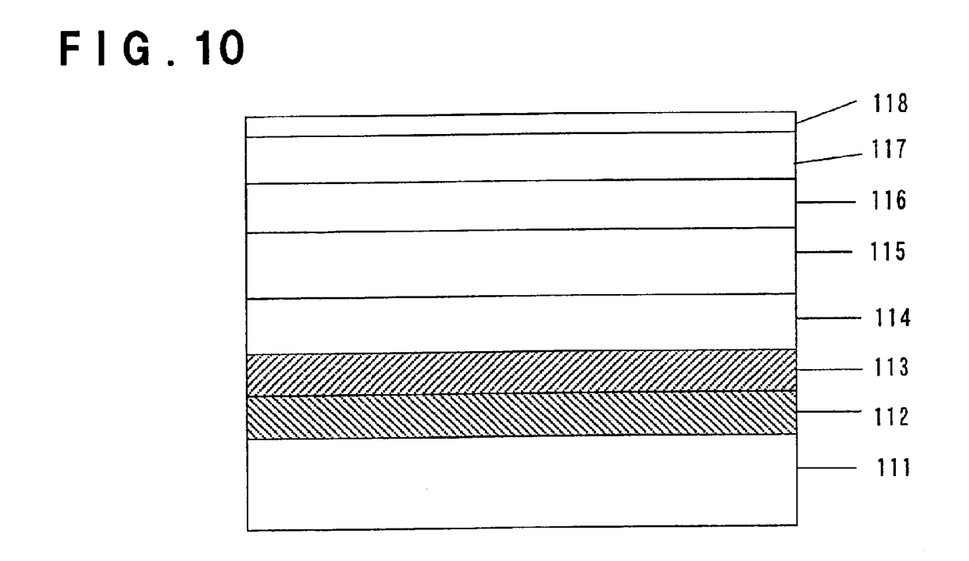
FIG. 10 is a partially cross-sectional view of an embodiment of the optical recording medium of the present invention wherein the matching layer comprises two layers of a first matching layer and a second matching layer, and a liquid lubricant layer is formed on the outermost surface of the medium.

A surface-side reproduction type optical recording medium for near field optical recording having the structure as shown in FIG. 10 was prepared. on a substrate 111 made of polycarbonate having a ratio of the groove width to the land width of 1:1, a groove depth of 50 nm and a track pitch (the pitch between a land and a groove) of 0.33 μm, a reflective layer 112 composed of $Ag_{98}Pd_1Ti_1$ was formed in a thickness of 40 nm by a DC sputtering method. On this, a recording layer 113 composed of TbFeCo was formed in a thickness of 20 nm by a DC sputtering method. On this, a dielectric layer 114 composed of SiN having a refractive index of 2.1 was formed in a thickness of 230 nm by a reactive DC sputtering method using a Si target in the atmosphere of a mixture of Ar and $N_2$. On this, a coating material composed of the same ultraviolet-curable resin monomer as used in Example 1 was coated by a spin coating method, followed by irradiation of ultraviolet rays for polymerization, whereby a transparent protective resin layer 115 containing polymethyl methacrylate as the main component, having a refractive index of 1.50 was formed in a thickness of 660 nm. On this, a first matching layer 116 containing polychlorostyrene as the main component, having a refractive index of 1.61 was formed in a thickness of 110 nm by the same method, and on this, a second matching layer 117 containing methylmethacrylate and polydimethylsiloxane as the main component and 0.1 wt % of fluorine type surfactant, having a refractive index of 1.45 was formed in a thickness of 170 nm. On this, a perfluoropolyether type liquid lubricant layer 118 was coated in 2 nm by a lifting method to thereby prepare the surface-side reproduction type optical recording medium.

In the medium, the optical layer thickness of the dielectric layer was 0.71λ; the optical layer thickness of the transparent protective resin layer was 1.45λ, and the optical layer thickness in the sum of the first and the second matching layers was 0.62λ. Further, the groove depth in the substrate was $\lambda/(9n_{OC})$. The step by the land and the groove of the substrate at the surface of the medium was 20 nm or less in the measurement with AFM. The diameter of laser beams at the medium surface was 3.6 μm.

Example 8

Surface-side reproduction type optical recording media for near field optical recording having the structure as shown in FIG. 7 were prepared. On each substrate 71 made of polycarbonate having a ratio of the groove width to the land width of 1:1, a groove depth of 50 nm and a track pitch (the pitch between the land and the groove) of 0.33 μm, a reflective layer 72 composed of $Ag_{98}Pd_1Ti_1$ was formed in a thickness of 40 nm by a DC sputtering method. On this, a lower dielectric layer 73 composed of SiAlN having a refractive index of 2.0 was formed in a thickness of 40 nm by a reactive DC sputtering method using a SiAl target in the atmosphere of a mixture of Ar and $N_2$. On this, a recording layer 74 composed of TbFeCo was formed in a thickness of 20 nm by a DC sputtering method. On this, a first dielectric layer 75 composed of SiN having a refractive index of 2.1 was formed in a thickness of 65 nm by a reactive DC sputtering method using a Si target in the atmosphere of a mixture of Ar and $N_2$. On this, a second dielectric layer 76 composed of SiON having a refractive index of 1.8 was formed in a thickness of 190 nm by a RF sputtering method using a SiON target in the atmosphere of a mixture of Ar and a slight amount of $N_2$. On this, a coating material composed of the same ultraviolet-curable resin monomer as used in Example 1 was coated by a spin coating method, followed by irradiation of ultraviolet rays for polymerization. Thus, 5 kinds of transparent protective resin layer 77 having layer thicknesses of 600, 750, 900, 1050 and 1200 nm and a refractive index of 1.5 were formed. Each of the transparent protective resin layers 77, a first matching layer 78 composed of SiN having a refractive index of 2.1 was formed in a thickness of 80 nm by a reactive DC sputtering method using a Si target in the atmosphere of a mixture of Ar and $N_2$. On this, a second matching layer 79 composed of $SiO_2$ having a refractive index of 1.45 was formed in a thickness of 165 nm by a RF sputtering method using a $SiO_2$ target. On this, a perfluoropolyether type liquid lubricant layer 80 was coated in 2 nm by a lifting method. Thus, the surface-side reproduction type optical recording media were prepared.

In recording and reproducing each of these media by using a laser wavelength λ of 685 nm, the optical layer thickness in the sum of the first and the second dielectric layers was 0.70λ, and the optical layer thickness in the sum of the first and the second matching layers was 0.59λ. Further, the groove depth in the substrate was λ/(9n$_{OC}$).

The transparent protective resin layers 77 indicated optical layer thicknesses of 1.31, 1.64, 1.97, 2.30 and 2.63λ with respect to layer thicknesses of 600, 750, 900, 1050 and 1200 nm respectively, and the diameters of laser beams at the medium surface were 3.4, 3.9, 4.4, 4.9 and 5.5 μm respectively. Further, the step by the land and the groove of the substrate at the surface of the medium was 20 nm or less in the measurement with AFM.

Example 9

A surface-side reproduction type optical recording medium was prepared by the same method as Example 8 except that the substrate 71 made of polycarbonate had a ratio of the groove to the land of 1:1, a groove depth of 75 nm and a track pitch (the pitch between the land and the groove) of 0.33 μm. The groove depth in the substrate was λ/(6n$_{OC}$). The step by the land and the groove of the substrate at the surface of the medium was 20 nm or less in the measurement with AFM. However, the thickness of the transparent protective resin layer was 900 nm.

Example 10

A surface-side reproduction type optical recording medium was prepared by the same method as Example 8 except that the substrate 71 made of polycarbonate was such one for groove-recording, having a ratio of the groove width to the land width of 1:2, a groove depth of 60 nm and a track pitch (the pitch between the grooves) of 0.40 μm. The step by the land and the groove of the substrate at the surface of the medium was 20 nm or less in the measurement with AFM. However, the thickness of the transparent protective resin layer was 900 nm.

Example 11

In this Example, a structure that the refractive index is stepwisely increased from the interface between the transparent protective resin layer and the matching layer toward a side of the medium surface was added to the medium structure in Example 8.

A surface-side reproduction type optical recording medium was prepared by the same method as Example 8 except that the thickness of the transparent protective resin layer was 900 nm, and the structure of the matching layer was changed from two layers to three layers, i.e., a first matching layer (thickness: 230 nm) composed of SiO$_2$ having a refractive index of 1.45, a second matching layer (thickness: 75 nm) composed of SiN having a refractive index of 2.1 and a third matching layer (thickness: 165 nm) composed of SiO$_2$ having a refractive index 1.45 were formed in this order on the transparent protective resin layer.

In recording and reproducing this medium by using a laser wavelength λ of 685 nm, the optical layer thickness in the sum of the first and the second dielectric layers was 0.70λ, and the optical layer thickness in the sum of the first to third matching layers was 1.08λ. Further, the groove depth in the substrate was λ/(9n$_{OC}$). The diameter of laser beams at the medium surface was 5.4 μm. The step by the land and the groove of the substrate at the surface of the medium was 20 nm or less in the measurement with AFM.

Each of the surface-side reproduction type optical recording media in Examples 5 to 10 and Comparative Example 3 was rotated at a linear velocity of 10 m/s to float a slider SIL head having a laser wavelength of 685 nm and an effective numerical aperture of 1.3 to a height of 70 nm from the thin layer surface. After having been focused to the optimum position on each medium by manual operations, the polarized plane of laser beams was made perpendicular to the groove, and laser was irradiated at a frequency of 84 MHz in a pulse form the laser was along the land or the groove, to heat the recording layer to the Curie temperature or more while the magnetic field of a coil on the SIL head was modulated with 21 MHz, whereby 2T signals having a length of mark of 0.25 μm were recorded. Here, the width of modulation of the magnetic field was ±130 Oe.

After the recording, the reproducing was conducted by a laser power of 1 mW (the polarized plane of laser beams was perpendicular to the groove), and carrier and noise in a resolution bandwidth of 30 kHz at a frequency of 21 MHz were measured. The ratio of the noise to the carrier was taken as CNR.

The crosstalk of signals at 21 MHz in adjacent tracks was examined. Here, the adjacent tracks indicate adjacent grooves in a case of conducting the recording to a land, and adjacent lands in a case of conducting the recording to a groove with respect to Examples 5 to 9 and Comparative Example 3, and adjacent grooves in a case of conducting the recording to a groove with respect to Example 10. In Examples 5 to 8 and Comparative Example 3, phase adjustment of returning light was conducted independently in the land and the groove, and the reproducing was performed so that CNR had the highest value in terms of the phase.

Further, measurement was conducted by fixing the phase to 0 in Examples 9 and 10. Further, in order to observe a state of the reflection of light at a high incident angle, the intensity of reflection light was compared with light at a low incident angle by setting a CCD camera at an eye level.

TABLE 3

| | Track pitch (μm) | Groove depth (nm) | Recording system | Thickness of protective layer (nm) | State of reflection of light at a high incident angle in groove-recording | CNB land (dB) | Groove (dB) | Crosstalk (dB) |
|---|---|---|---|---|---|---|---|---|
| Ex. 5 | 0.33 | 50 | L/G | 480 | ○ | 44 | 44 | −30 |
| Comp. Ex. 3 | 0.33 | 50 | L/G | Nil | × | 45 | 39 | −20 |
| Ex. 6 | 0.33 | 50 | L/G | 480 | ⊙ | 45 | 45 | −32 |

TABLE 3-continued

| | Track pitch (μm) | Groove depth (nm) | Recording system | Thickness of protective layer (nm) | State of reflection of light at a high incident angle in groove-recording | CNB land (dB) | Groove (dB) | Crosstalk (dB) |
|---|---|---|---|---|---|---|---|---|
| Ex. 7 | 0.33 | 50 | L/G | 660 | ◉ | 45 | 45 | −31 |
| Ex. 8 | 0.33 | 50 | L/G | 600 | ◉ | 46 | 46 | −33 |
| | 0.33 | 50 | L/G | 750 | ◉ | 47 | 46 | −32 |
| | 0.33 | 50 | L/G | 900 | ◉ | 46 | 47 | −34 |
| | 0.33 | 50 | L/G | 1050 | ◉ | 46 | 46 | −30 |
| | 0.33 | 50 | L/G | 1200 | ◉ | 46 | 47 | −33 |
| Ex. 9 | 0.33 | 75 | L/G | 900 | ◉ | 46 | 45 | −28 |
| Ex. 10 | 0.4 | 60 | G | 900 | ◉ | — | 45 | −35 |
| Ex. 11 | 0.33 | 50 | L/G | 900 | ◉ | 47 | 47 | −35 |

With respect to a state of reflection of light at a high incident angle in a case of conducting the recording in the groove, good results were obtained except for Comparative Example 3. In particular, better results were obtained by, in particular, forming the dielectric layer and the transparent protective resin layer each comprising two or more layers having different refractive indices, or, by forming the matching layer on the transparent protective resin layer as in Examples 6 to 10.

CNR in recording to the groove was extremely low in Comparative Example 3. However, good values as 43 dB or more could be obtained in Examples 5 to 10. Further, good results were obtained by forming the dielectric layer and the transparent protective resin layer each comprising two or more layers having different refractive indices, or forming the matching layer on the transparent protective resin layer as in Examples 6 to 10. Although Comparative Example 3 had a large value of crosstalking such as −20 dB, good values such as −25 dB or less were obtained in Examples 5 to 10.

Then, the focus was fixed to the medium having the transparent protective resin layer of 900 nm thick in Example 8, and CNR of the media having the transparent protective resin layers of 600, 750, 900, 1050 and 1200 nm thick was measured. Table 4 shows a result.

From the result, it was confirmed that when the difference between the maximum thickness and the minimum thickness (the unevenness of layer thickness) of the transparent protective resin layers in a recording region was within $\lambda/NA^2$, recording and reproducing were possible without a focus servo even in a case of land/groove recording. The optical recording media in Example 8 satisfied such condition.

TABLE 4

| Thickness of protective layer (nm) | CNR Land (dB) | Groove (dB) |
|---|---|---|
| 600 | 42 | 41 |
| 750 | 46 | 46 |
| 900 | 47 | 47 |
| 1050 | 46 | 46 |
| 1200 | 41 | 41 |

Example 12

A surface-side reproduction type optical recording medium having the structure as shown in FIG. 4 was prepared. On a substrate 41 made of polycarbonate, with a guide groove (a groove) having a track pitch of 0.4 μm, a reflective layer 42 composed of $Ag_{98}Pd_1Ti_1$ was formed in a thickness of 40 nm by a DC sputtering method. On this, a recording layer 43 composed on TbFeCo was formed in a thickness of 20 nm by a DC sputtering method. On this, a dielectric layer 44 composed of SiN having a refractive index of 2.1 was formed in a thickness of 230 nm by a reactive DC sputtering method using a Si target in the atmosphere of a mixture of Ar and $N_2$. On this, a composite coating material, which was prepared by adding a dispersant to the same ultraviolet-curable resin monomer as Example 1, and further, adding 50 wt % of ultra-fine particles (average particle size of 0.02 μm) of ITO having a refractive index of 2.0, followed by mixing sufficiently, was coated by a spin coating method. The coating material was polymerized by irradiation of ultraviolet rays to thereby form an ITO ultra-fine particle-dispersed transparent protective resin layer (thickness: 850 nm) having a refractive index of 1.65.

On this, a perfluoropolyether type liquid lubricant layer 46 was coated in 2 nm by a lifting method. Thus, the surface-side reproduction type optical recording medium was prepared.

In recording and reproducing the medium by using a laser wavelength $\lambda$ of 685 nm, the optical layer thickness (the actual layer thickness×refractive index) of the dielectric layer was $0.71\lambda$, and the optical layer thickness of the transparent protective resin layer was $2.06\lambda$. Further, the diameter of laser beams at the medium surface was 2.6 μm.

Example 13

A surface-side reproduction type optical recording medium was prepared by the same method as Example 1 except that a dielectric layer 44 composed of ZnS-50 wt % TiO$_2$ having a refractive index of 2.4 was formed in a thickness of 200 nm by a RF sputtering method using a ZnS—TiO$_2$ target in the atmosphere of Ar, and on this, a transparent protective resin layer having a refractive index of 1.5 was formed in 940 nm.

In recording and reproducing the medium by a laser wavelength λ of 685 nm, the optical layer thickness (the actual layer thickness×refractive index) of the dielectric layer was 0.71λ and the optical layer thickness of the transparent protective resin layer was 2.06λ. Further, the diameter of laser beams at the medium surface was 3.5 μm.

Example 14

A surface-side reproduction type optical recording medium was prepared by the same method as Example 1 except that a dielectric layer 44 composed of SrNb$_2$O$_6$ having a refractive index of 2.6 was formed in a thickness of 185 nm by a RF sputtering method using a SrNb$_2$O$_6$ target in the atmosphere of a mixture of Ar and O$_2$, and on this, a transparent protective resin layer having a refractive index of 1.5 was formed in 940 nm.

In recording and reproducing the medium by using a laser wavelength λ of 685 nm, the optical layer thickness (the actual layer thickness×refractive index) of the dielectric layer was 0.71λ, and the optical layer thickness of the transparent protective resin layer was 2.06λ. Further, the diameter of laser beams at the medium surface was 3.5 μm.

Each of the surface-side reproduction type optical recording media in Examples 12 and 13 was rotated at a linear velocity of 10 m/s to float a slider SIL head having a laser wavelength of 685 nm and an effective numerical aperture of 1.3 to a height of 70 nm from the thin layer surface. After having been focused to the optimum position on each medium by manual operations, laser was irradiated at a frequency of 84 MHz in a pulse form to heat the recording layer to the Curie temperature or more while the magnetic field of a coil on the SIL head was modulated with 21 MHz, whereby 2T signals having a length of mark of 0.24 μm were recorded. Here, the width of modulation of the magnetic field was ±130 Oe.

After the recording, the reproducing was conducted by the laser power of 1 mW, and carrier and noise were measured in a resolution bandwidth of 30 kHz at 21 MHz. The ratio of the noise to the carrier was taken as CNR.

Examples 12 to 14 indicated CNR of 43 dB, 45 dB and 46 dB respectively. Example 12 was equivalent to Example 1, and Examples 13 and 14 could provide CNR comparable to that in Examples 3 and 4 having the matching layer.

With respect to flying characteristics, every medium was good. With respect to continuous recording, every medium could continue tests of 20 times to the last.

Then, each of the surface-side reproduction type optical recording media in Examples 1 and 12 to 14 was put in a casing having an antistatic function to find a charge of electricity. In Example 12, only a static electricity of 0.3 kV was found. However, in Examples 1, 13 and 14, a static electricity of 2 to 3 kV was found. In comparison of the pencil hardness of the surface of Example 1 with that of Examples 12 to 14, "H" was found in Example 1, and "3H" was obtained in Example 12 to 14. Although there is no large difference in the flying characteristics and the continuous recording, it can be considered that the possibility of occurrence of a defect in the media by the head is low during a long-term use in Examples 12 to 14.

Further, in Example 12, the deposition of a foreign matter is not likely to cause because the charge of electricity is little.

(Effect of the Invention)

According to the present invention, a surface-side reproduction type optical recording medium for carrying out recording or reproducing with laser beams from an optical head having a numerical aperture NA of more than 1 wherein the optical head is floated from the surface of the medium at a height of λ/4 or less where λ is the wavelength of the laser beams, comprises at least a recording layer and a transparent protective resin layer having a refractive index $n_p$ of more than the NA which are formed on the substrate, wherein the diameter of the laser beams on the medium surface is from 1.5 μm to 30 μm, whereby continuous recording becomes possible in a stable manner for a long time.

Further, since the diameter of laser beams is 30 μm or less, a projection is formed in a lower surface of the optical head, whereby it is possible to prevent the contact of the medium surface to the optical head. Further, when $\Delta t \leq \lambda/Na^2$, where Δt indicates a degree of unevenness of the layer thickness of the transparent protective resin layer in a recording region, a focus servo can be omitted.

Further, a dielectric layer having a refractive index of at least 0.4 larger than NA is formed on the recording layer; the refractive index of the dielectric layer was decreased stepwisely or continuously toward the medium surface, or a matching layer for matching optically laser light is formed on the transparent protective resin layer, whereby light at a high incident angle satisfies the condition of low reflection; laser beams can be well converged, and high SNR and high resolution can be obtained. Further, high SNR and high resolution can be obtained even by rendering the refractive index $n_d$ of the dielectric layer to be 2.4 or more.

Further, since a transparent resin of the protective layer contains ultra-fine particles of inorganic material, the hardness of the transparent protective resin layer can be increased to improve reliability.

What is claimed is:

1. A surface-side reproduction type optical recording medium for carrying out recording or reproducing with laser beams from an optical head having a numerical aperture NA of more than 1 wherein the optical head is floated from the surface of the medium at a height of λ/4 or less where λ is the wavelength of the laser beams, the surface-side reproduction type optical recording medium being characterized in that at least a recording layer and a transparent protective resin layer having a refractive index $n_p$ of more than the NA are formed on the substrate, and the diameter of the laser beams on the medium surface is from 1.5 μm to 30 μm.

2. The surface-side reproduction type optical recording medium according to claim 1, wherein the thickness of the transparent protective resin layer is λ/NA$^2$ or more.

3. The surface-side reproduction type optical recording medium according to claim 1, wherein $\Delta t \leq \lambda/NA^2$ where Δt is a degree of unevenness of the layer thickness of the transparent protective resin layer in a recording region.

4. The surface-side reproduction type optical recording medium according to claim 1, wherein a dielectric layer having a refractive index which is at least 0.4 larger than the NA is formed between the recording layer and the transparent protective resin layer.

5. The surface-side reproduction type optical recording medium according to claim 4, wherein the thickness of the dielectric layer is less than λ/NA$^2$.

6. The surface-side reproduction type optical recording medium according to claim 4, wherein the refractive index of the dielectric layer decreases stepwisely or continuously toward the medium surface.

7. The surface-side reproduction type optical recording medium according to claim 1, wherein a matching layer for reducing reflection light of laser from the medium surface is formed on the transparent protective resin layer.

8. The surface-side reproduction type optical recording medium according to claim 7, wherein the refractive index of the matching layer is NA or more, and the refractive index increases stepwisely or continuously from the uppermost layer of the matching layer toward the transparent protective resin layer.

9. The surface-side reproduction type optical recording medium according to claim 7, wherein the refractive index of the matching layer is NA or more; the refractive index increases stepwisely or continuously from the uppermost layer of the matching layer toward the transparent protective resin layer, and the refractive index again decreases stepwisely or continuously.

10. The surface-side reproduction type optical recording medium according to claim 7, wherein a part or the entirety of the matching layer is composed of a transparent resin.

11. The surface-side reproduction type optical recording medium according to claim 10, wherein the transparent resin of the matching layer includes ultra-fine particles of inorganic material having a diameter of 0.05 $\mu$m or less.

12. The surface-side reproduction type optical recording medium according to claim 1, wherein the medium surface is composed of a liquid lubricant layer.

13. The surface-side reproduction type optical recording medium according to claim 1, wherein the medium surface is composed of a transparent protective resin layer including a fluorine type lubricant or a fluorine type surfactant.

14. The surface-side reproduction type optical recording medium according to claim 7, wherein the medium surface is composed of a matching layer including a fluorine type lubricant or a fluorine type surfactant.

15. The surface-side reproduction type optical recording medium according to claim 1, wherein a land and a groove are formed in the substrate surface.

16. The surface-side reproduction type optical recording medium according to claim 15, wherein the width of the land/the width of the groove (the ratio in the full width at half maximum) is from 0.5 to 1.5.

17. The surface-side reproduction type optical recording medium according to claim 15, wherein the depth $d_G$ of the groove in the substrate is $\lambda/(14\ n_{OC}) \leq d_G \leq \lambda/(5\ n_{OC})$ where $n_{OC}$ is the refractive index of the transparent protective resin layer.

18. A surface-side reproduction type optical recording medium for carrying out recording or reproducing with laser beams from an optical head having a numerical aperture NA of more than 1 wherein the optical head is floated from the surface of the medium at a height of $\lambda/4$ or less where $\lambda$ is the wavelength of the laser beams, the surface-side reproduction type optical recording medium being characterized in that at least a recording layer and a transparent protective resin layer having a refractive index $n_p$ of more than the NA are formed on the substrate, and the transparent protective resin layer includes ultra-fine particles of inorganic material having a diameter of 0.05 $\mu$m or less.

19. The surface-side reproduction type optical recording medium according to claim 18, wherein the ultra-fine particles of inorganic material are transparent electric conductive particles.

20. The surface-side reproduction type optical recording medium according to claim 18, wherein the ultra-fine particles of inorganic material are those of aluminum oxide, aluminum nitride, boron nitride, silicon carbide, beryllium oxide or diamond.

21. A surface-side reproduction type optical recording medium for carrying out recording or reproducing with laser beams from an optical head having a numerical aperture NA of more than 1 wherein the optical head is floated from the surface of the medium at a height of $\lambda/4$ or less where $\lambda$ is the wavelength of the laser beams, the surface-side reproduction type optical recording medium being characterized in that at least a recording layer, a dielectric layer and a transparent protective resin layer having a refractive index $n_p$ of more than the NA are formed on the substrate in this order, and the refractive index $n_d$ of the dielectric layer is 2.4 or more.

22. The surface-side reproduction type optical recording medium according to claim 21, wherein the dielectric layer is composed of at least one kind of material selected from the group consisting of ZnS, $Nb_2O_5$ and $TiO_2$.

23. The surface-side reproduction type optical recording medium according to claim 21, wherein the dielectric layer is made of a material expressed generally by $(MA)_1(MB)_2O_6$ where MA is composed of at least one kind of material selected from the group consisting of Mg, Ca, Sr and Ba, and MB is composed of at least one kind of material selected from the group consisting of V, Nb and Ta.

24. The surface-side reproduction type optical recording medium according to claim 21, wherein the dielectric layer is composed of a perovskite compound or a material containing at least 80% by weight of the perovskite compound.

25. A surface-side reproduction type optical recording medium for carrying out recording or reproducing with laser beams from an optical head having a numerical aperture NA of more than 1 wherein the optical head is floated from the surface of the medium at a height of $\lambda/4$ or less where $\lambda$ is the wavelength of the laser beams, the surface-side reproduction type optical recording medium being characterized in that a land and a groove are formed in a substrate surface; at least a recording layer and a transparent protective resin layer having a refractive index $n_p$ of more than the NA are formed on the substrate, and the step formed between the land and the groove in the surface of the transparent protective resin layer is $\lambda/30$ or less.

26. The surface-side reproduction type optical recording medium according to claim 25, wherein the width of the land/the width of the groove (the ratio in the full width at half maximum) is from 0.5 to 1.5.

27. The surface-side reproduction type optical recording medium according to claim 25, wherein the width of the groove is broader than the width of the land.

28. The surface-side reproduction type optical recording medium according to claim 25, wherein the depth $d_G$ of the groove in the substrate is $\lambda/(14\ n_{OC}) \leq d_G \leq \lambda/(5\ n_{OC})$ where $n_{OC}$ is the refractive index of the transparent protective resin layer.

* * * * *